April 7, 1936.  W. A. GARRATT  2,036,625

TRANSMISSION

Original Filed Sept. 9, 1932  3 Sheets-Sheet 1

INVENTOR.
BY Walter A. Garratt
Wood & Wood
ATTORNEYS

April 7, 1936.  W. A. GARRATT  2,036,625
TRANSMISSION
Original Filed Sept. 9, 1932  3 Sheets-Sheet 2
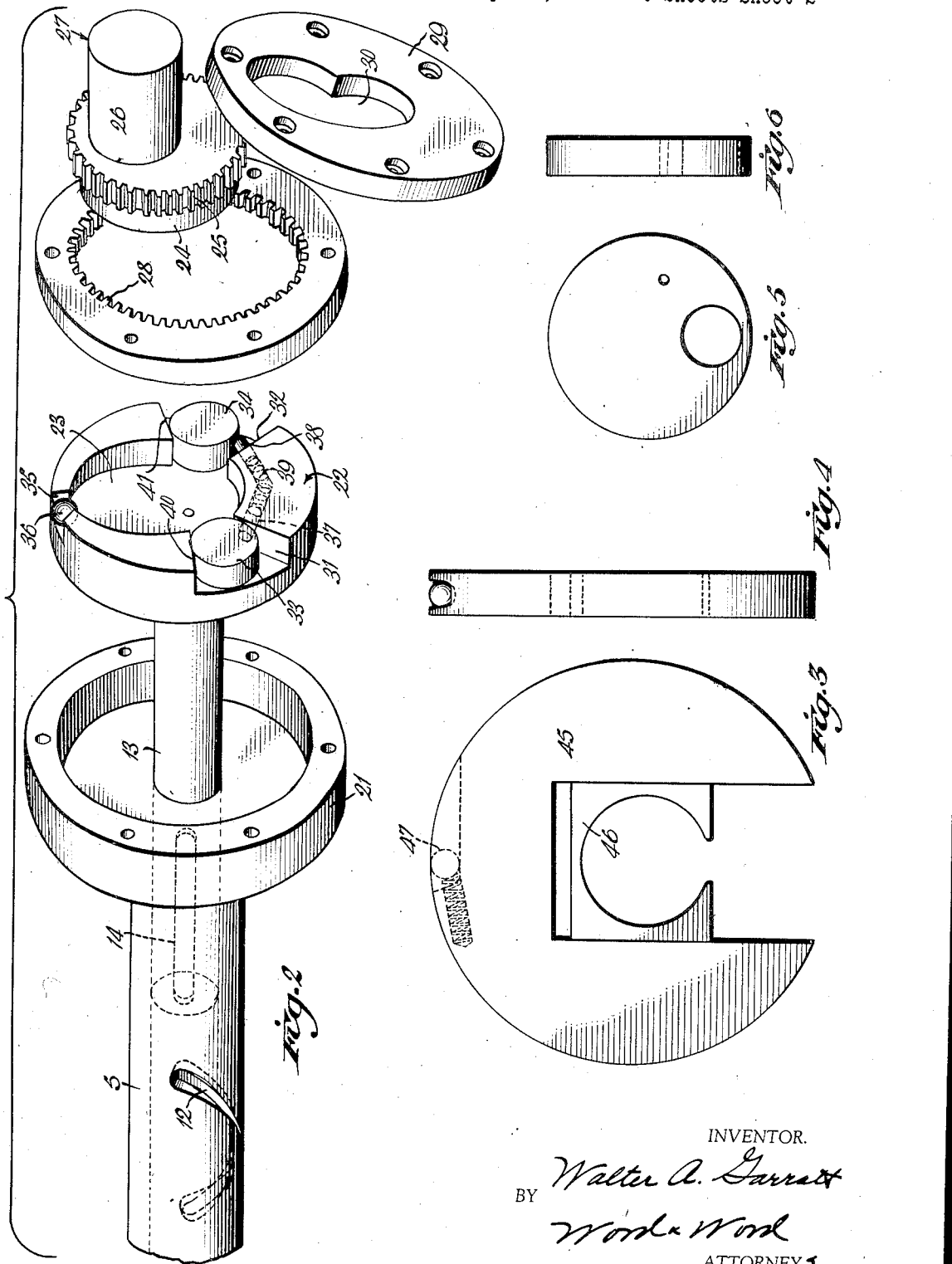
INVENTOR.
Walter A. Garratt
BY Wood & Wood
ATTORNEYS April 7, 1936. W. A. GARRATT 2,036,625
TRANSMISSION
Original Filed Sept. 9, 1932   3 Sheets-Sheet 3

INVENTOR.
Walter A. Garratt
BY
Word & Word
ATTORNEYS

Patented Apr. 7, 1936

2,036,625

UNITED STATES PATENT OFFICE 2,036,625

TRANSMISSION

Walter A. Garratt, Covington, Ky.

Original application September 9, 1932, Serial No. 632,407. Divided and this application January 7, 1935, Serial No. 692

11 Claims. (Cl. 74—600)

My invention relates to transmissions, and is particularly directed to improvements in adjustable crank pin mechanism.

The objects of this invention are to provide first a range of variation or adjustment with an infinite number of crank pin positions from zero eccentricity up to the maximum throw provided in the design of the machine; second, to allow adjustment while the mechanism is in motion; and third, to provide for automatically locking the crank pin or other member in any selected eccentric relationship to the drive shaft axis without strain on the adjusting parts.

The present application is divisional of my co-pending application Serial Number 632,407, filed September 9, 1932, for Variable speed power transmission.

Other objects and further advantages will be more fully apparent from a description of the accompanying drawings, in which:

Figure 2 is an exploded view drawn to a larger scale than Figure 1, and showing the essential parts of the device.

Figure 3 is a face view of one of the driver discs.

Figure 4 is a side view thereof.

Figure 5 is a face view of one of the suspension bodies.

Figure 6 is a side view thereof.

Figure 1:
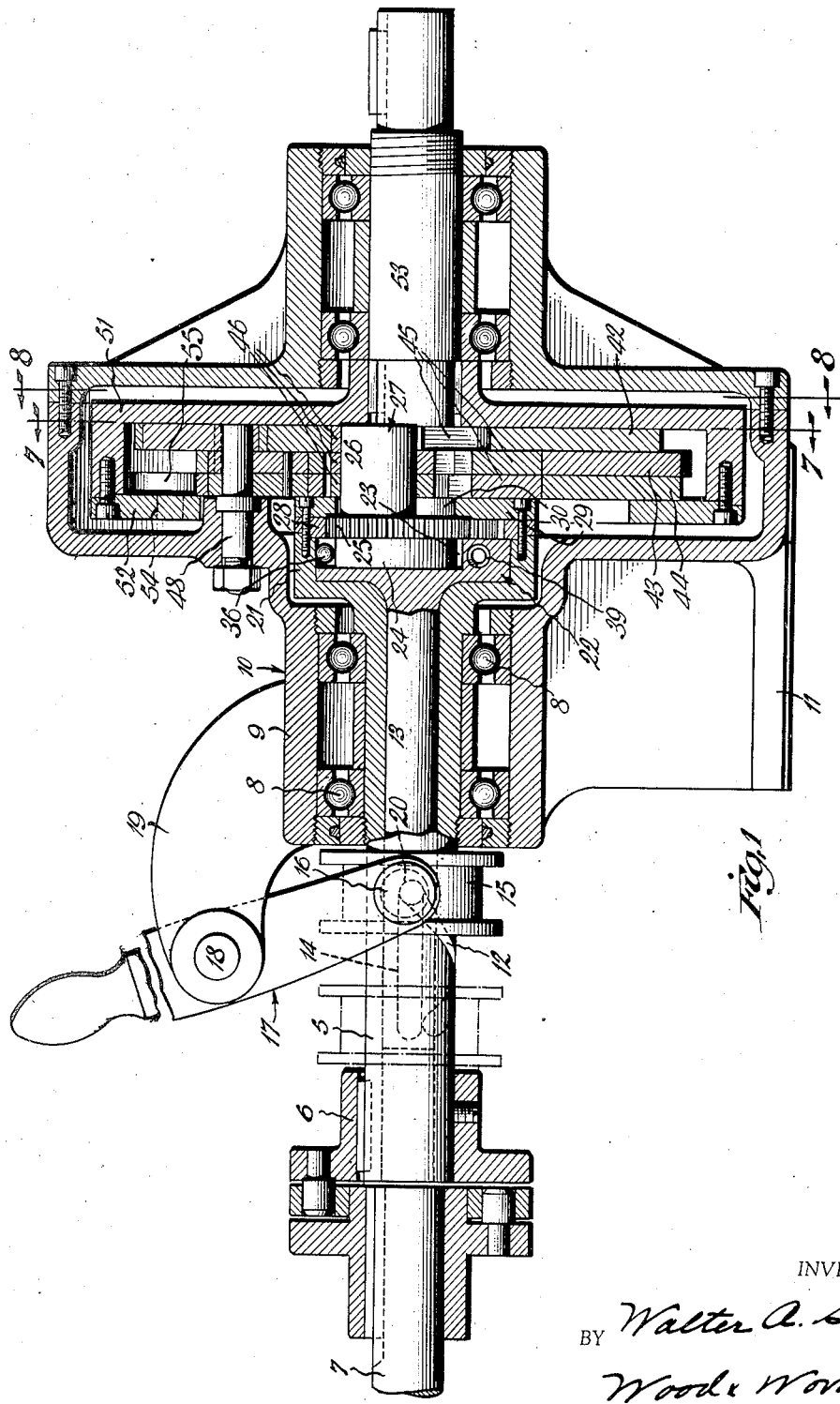
Figure 1 is a longitudinal vertical cross sectional view of the device of this invention.
Figure 7:
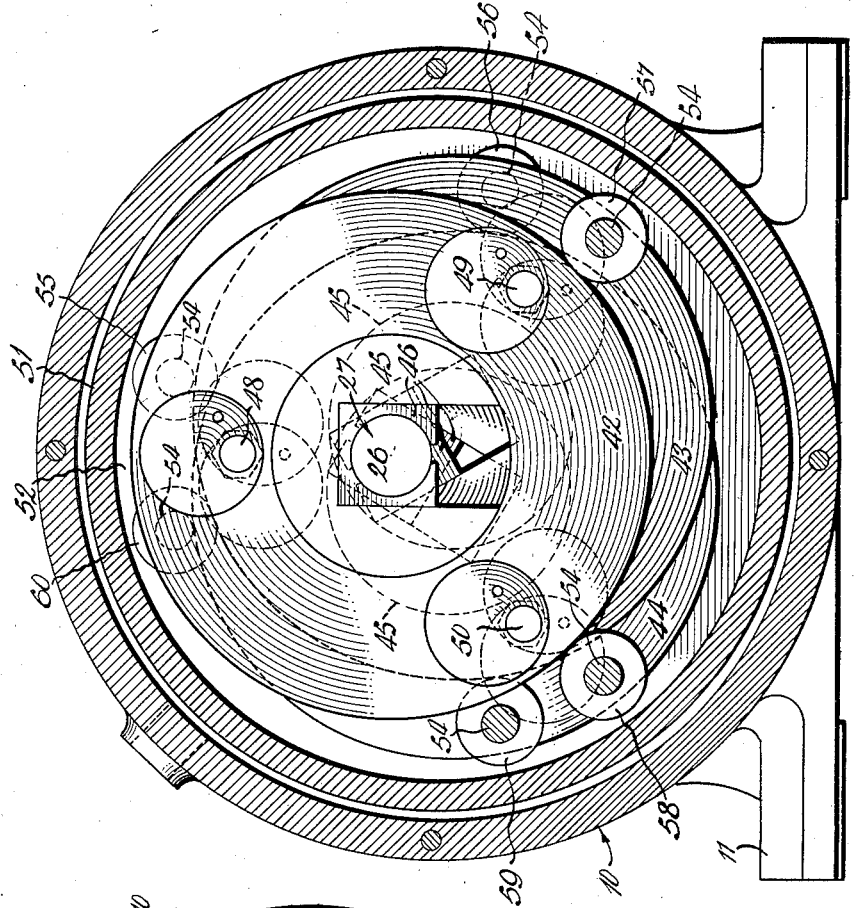
Figure 7 is a sectional view taken on line 7—7, Fig. 1.
Figure 8:
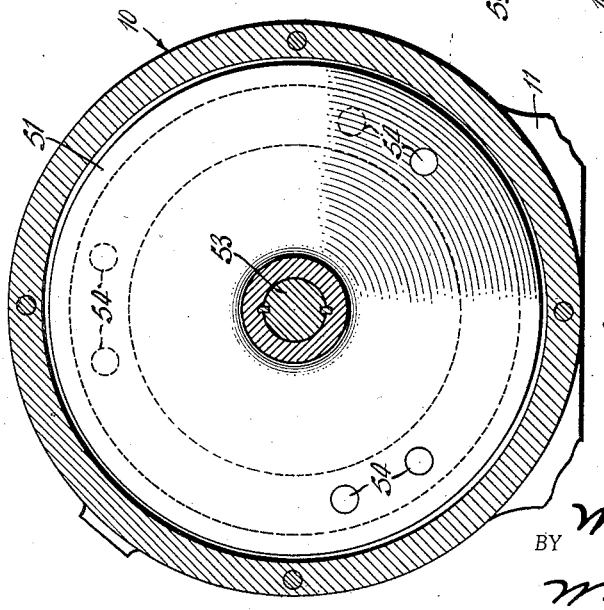
Figure 8 is a sectional view taken on line 8—8, Fig. 1.

Motion may be transmitted through this device from either end to the other, but it will be assumed for the purpose of description of the parts and their relationship that 5 is a drive shaft in the form of a sleeve connected by any suitable coupling as 6 to the drive shaft 7 of any source of motive power (not shown). The drive shaft or sleeve 5 is journalled in ball bearings 8 in a hub 9 of a transmission frame or housing 10 which may have a base as at 11. The wall of the sleeve 5 includes a spiral slot 12. Rotatably fitting in the sleeve 5 is a shaft 13 extending from a point beyond the outer end of the spiral slot 12 into the interior of the transmission housing. The shaft 13 has a longitudinal groove or keyway 14 formed therein. Around the sleeve 5 is a circumferentially grooved collar 15 which is longitudinally slidable on the sleeve 5. In the groove of the collar 15 is fitted the forked end 16 of a control lever 17 which is pivoted on a stud 18 which is fixed in an arm 19 of the housing 10. This arm may be attached to the floor or wall or any stationary object as may be convenient.

In the collar 15 is fixed a pin 20 extending from the surface of the groove in the collar inwardly through the spiral groove 12 of the sleeve 5 and into the straight groove 14 of the shaft 13. This pin does not extend into the control lever forked end. It should of course be preferably of a diameter snugly slidably fitting the width of the groove and slot so as to prevent back lash. From this description it follows that the collar 15 will rotate with the sleeve 5 and as it is moved longitudinally by shifting the control lever 17 the angular relationship of sleeve 5 and shaft 13 will be changed and that this shift may be accomplished while the sleeve 5, which is the drive member, is rotating.

Obviously the same function would be performed if the slot 12 were straight and the groove 14 were spiral or if both groove and slot were spiral but were relatively angular to each other. Also, it is understood that this means of changing the angular relationship of two members rotating on the same axis is well known in the art and that other means for performing this function such as differential gearing are also well known.

At the inward end of the sleeve 5 as an integral part thereof is a hollow cylinder or bell shaped casing 21. At the inward end of shaft 13 a disc shaped member 22 is fixed thereto within the casing 21 and concentric to it. The disc member 22 includes a circular recess 23 which is eccentric to the axis of the shaft 13 and which contains, fitted loosely, the hub 24 of a gear 25 carrying a crank pin 26. The last three members 24, 25 and 26, are fixed in relationship to one another and are preferably in one piece as shown and may be hereinafter referred to as the crank pin element 27. The crank pin 26 is eccentric to the hub 25 by the same amount that the recess 23 is eccentric to the axis of the shaft 13. The spur gear 25 is concentric with the hub 24 and its teeth engage the teeth of an internal gear member 28 which is fastened to the open face of the bell shaped casing 21 and is concentric to it. Other means than the gears could be used for constraining the movement of the hub in relation to the casing 21.

It is seen therefore that as the disc member 22 rotates with the shaft 13 in relation to the bell shaped casing 21, it will rotate the crank pin element 27 about the same axis and, the gear teeth of spur gear 25 being constantly in mesh with the internal gear teeth of gear 28, the crank pin element 27 will also rotate on its own axis. The two movements will cause crank pin 26 to move through a range between a position concentric to the axis of the drive shaft 5 which is the same as the axis of shaft 13 to a position eccentric to that axis by the amount of the sum of the eccentricity of the recess in relation to the drive shaft axis and the eccentricity of the crank pin 26 in relation to the crank pin element 27.

It is further evident that if the two eccentricities last referred to are made of unequal measurements the crank pin 26 cannot be brought to a position concentric to the drive shaft axis. In such case, when the crank pin mechanism is driving a transmission of the type hereinafter described, the output speed of the transmission cannot be reduced to zero and this limitation may be had.

A plate 29 is fastened to the outer face of the internal gear 28 and is provided with a perforation 30 through which the crank pin 26 extends. This plate maintains the various parts within the casing 21 so that their axes remain parallel. The perforation 30 is of such size and shape as to limit the position of the crank pin 26 to the range of movement from the position of concentricity with the drive shaft axis to the position of maximum eccentricity, and it is possible by altering the perforation to impose any desired limits within this range.

The spiral perforation 12 in the sleeve 5 and the straight groove 14 in the shaft 13 are of a length and relative pitch which will provide sufficient relative angular change between the sleeve 5 with its bell shaped casing 21 and the shaft 13 with its disc member 22 as will cause the crank pin 26 to move through its full range. By shortening the length of the spiral perforation or of the straight groove, it is also possible to limit the range of eccentricity of the crank pin 26 relative to the drive shaft axis.

Up to this point in the description, the driving connection between the disc member 22 and the crank pin element 27 has been considered as occurring through the contact or fit of the hub 24 in the recess 23. However, it is preferable to provide a clutch mechanism between the disc member 22 and the crank pin element, and in this case the recess is only provided for purposes of clearance for the proper relationship between the clutch means, the disc member 22 and the crank pin element.

In the disc member 22 fixed to the end of the control shaft 13 are formed two slots 31, 32, through the wall of the recess 23 for receiving rollers 33 and 34, whose axes are parallel to the drive shaft axis. The sides of these slots are planes radial to the drive shaft axis and the slots are very slightly wider than the diameter of the rollers. These slots are placed on each side of the thickest portion of the wall of the recess 23. Since the recess 23 is eccentric to the face of the disc member 22, the sides of the slots are of unequal length. The average of the length of the walls of the slots is slightly less than the diameter of the rollers.

In another slot 35 in the thinnest portion of the wall of the recess 23 is placed a ball 36 proportioned to its slot as are the rollers 33 and 34 to theirs. Also it is evident that the spur gear 25 concentric to the hub 24 and fixed to it, meshes with the internal gear 28 fixed and concentric to the casing 21 at a point adjacent to the ball 36. If the teeth of the two gears are formed so that they bottom without binding and the pitch line of the gears is properly related to the shaft axis, then the ball 36 may be omited. Plungers 37 and 38 actuated by spring 39 urge the rollers 33 and 34 away from each other.

It is now evident that when a load is imposed on the crank pin 26 opposed to the driving rotation of the drive shaft 5, the hub 24 is constrained by the gear teeth to press the roller which it tends to approach against the inner wall of the casing 21 so that driving connection between the drive shaft and the crank pin is established, the spring pressing against the roller aiding in this function. No practical working load imposed upon the crank pin 21 can cause the throw of the crank pin to change and at the same time there is no strain imposed upon the disc member 22 or its control shaft 13, or the parts associated with the control lever 17, and therefore shaft 13 with its disc member 22 is free to rotate with the drive shaft.

If now the control lever be shifted and the disc 22 caused to rotate relative to the drive shaft 5 then the thrust of projection 40 against roller 33 or of projection 41 against roller 34, whichever is appropriate according to the direction of relative rotation of the adjusting shaft, will unlock the roller from fixed connection between casing 21 and hub 24 and as the rollers are moved around the hub, the crank pin element 27 will rotate on its own axis, being constrained by the gear teeth, and the throw of the crank pin will be changed. From this explanation it is evident that the cylindrical shape of the roller is not essential to the operation of the device. Blocks of substantially the same shape as the slots in which the rollers are contained could be used.

The remaining parts of the mechanism, shown herewith, are not part of the invention disclosed herein, but they or other parts of similar function may be driven by the crank pin of this invention. A more detailed description of these parts is given in the pending application Serial No. 632,407, filed September 9, 1932, heretofore mentioned and of which this application is divisional. For this disclosure the description is made brief as follows.

Around the crank pin 26 are disposed throw plates 42, 43, and 44, each having a central hole in which is contained a driver disc 45 including a driver shoe 46 which fits upon the crank pin 26. The driver discs 45 by means of clutches 47 are adapted to act as driving connections between the crank pin 26 and the throw plates 42, 43 and 44. These plates are suspended from the housing 10 by studs 48, 49 and 50, each of which studs supports in fixed rotatable relation to each other a set of three suspension bodies, one on each stud for each throw plate, disposed eccentrically about the studs. The studs and suspension bodies limit the movement of the throw plates 42, 43 and 44 to pseudo-rotation, that is, the plates cannot rotate on their own centers but their centers describe equal circles about a common axis.

A drum shaped member 51 having an inner face plate 52 encloses the throw plates and is fixed rotatively to a driven shaft 53. From the two faces of this drum shaped member, studs 54 extend inwardly and support rollers or bearings 55, 56, 57, 58, 59 and 60, two for each throw plate disposed equidistant from the driven shaft axis and adapted to receive the pseudo-rotation of the eccentric plates 42, 43, 44, and cause rotation of the drum shaped member 51 and the driven shaft 53.

The angular movement of pseudo-rotation of the throw plates 42, 43 and 44, is proportional to the throw of the crank pin 26. The rotation of the driven shaft is equal to the pseudo-rotation of the throw plates and the rotation of the crank pin 26 is equal to the rotation of the drive shaft 5 so that variation in the throw of the crank pin accomplishes a variation in the ratio of speed between the drive and driven shafts.

Having described my invention, I claim:

1. In combination, a sleeve adapted to be rotated, a disc mounted coaxially with said sleeve and adapted to rotate therewith and relative thereto, said disc having a cylindrical recess parallel with and eccentric to its axis, a cylindrical hub having a crank pin thereon, said hub mounted for rotation in the cylindrical recess, clutch members interposed between said hub and said sleeve for a driving connection between the sleeve and the cylindrical hub, and means for rotating the disc relative to the sleeve.

2. In combination, a sleeve adapted to be rotated, a disc mounted coaxial with said sleeve adapted to rotate therewith and having a cylindrical recess therein eccentric to its axis, a hub member mounted freely adjustably in the eccentric recess and having a crank pin projecting therefrom, and clutch members interposed between the hub member and the sleeve for locking the sleeve to the hub member as the sleeve is being rotated.

3. In combination, a sleeve adapted to be rotated, a disc mounted coaxially with and adapted to rotate with said sleeve and relative thereto, said disc including a cylindrical recess parallel with and eccentric to its axis, a hub member rotatively adjustably mounted in the eccentric recess in the disc and having a crank pin thereon, locking elements interposed between the sleeve and the hub member for the purpose of preventing movement of the hub member relative to the disc or disc and sleeve when the sleeve is being driven, and means adapted to rotate the hub member within the cylindrical recess upon relative rotation of the sleeve and the disc.

4. In a device of the class described, a drive member, a cooperative member rotatively mounted within a portion of the drive member, a driven member having a cylindrical hub eccentric to the axis thereof, said cylindrical hub rotatively mounted in the cooperative member eccentric to the axis of the drive member, and clutch means interposed between the drive member and the cylindrical hub for transmitting driving motion between the drive member and the cylindrical hub.

5. In a device of the class described, a drive member, a cooperative member rotatively mounted within a portion of the drive member, a driven member having a cylindrical hub rotatively mounted in the cooperative member parallel with and eccentric to the axis of the drive member, clutch members in the cooperative member, and yielding means engaging the clutch members and adapted to hold the clutch members in driving contact with the drive member and the cylindrical hub when the drive member is being rotated.

6. In a device of the class described, a drive member, a coacting member rotatively mounted within a portion of the drive member, a driven member having a cylindrical hub fitting loosely within the coacting member parallel with and eccentric to the axis of the drive member, clutch members mounted in the coacting member and adapted to be released by relative rotation of the drive member and the coacting member, yielding means for holding the clutch members in driving contact with the drive member and the cylindrical hub when the drive member is being rotated, and means fixed to the drive member for rotating the driven member about the axis of the cylindrical hub upon relative rotation of the drive member and the coacting member.

7. In a device of the class described, a drive member, a coacting member rotatively mounted within a portion of the drive member, a driven member having a cylindrical hub eccentric to the axis of the driven member rotatively mounted in the coacting member parallel with and eccentric to the axis of the drive member, clutch means interposed between the drive member and the driven member adapted to be released by relative rotation between the drive member and the coacting member for transmitting driving motion when there is no relative motion between the driving member and the cylindrical hub, and means for rotating the coacting member relative to the drive member.

8. In a device of the class described, a sleeve having a slot extending through the wall thereof, a shaft rotatively mounted within the sleeve and having a slot cut in its exterior surface, said slots having different helical leads, a collar surrounding the sleeve, a pin projecting from the collar through the slot in the sleeve and into the slot in the shaft, means for moving the collar axially on the sleeve, a cylindrical hub carrying a crank pin and mounted for rotation in a portion of the shaft parallel with and eccentric to the axis of said sleeve, clutch members mounted in the shaft and adapted to be released by relative rotation of the sleeve and shaft, said clutch members adapted to transmit driving motion from the sleeve to the cylindrical hub, yielding means for holding the clutch members in driving contact with the sleeve and the cylindrical hub, a connecting element between the sleeve and the cylindrical hub for constraining the movement of the crank pin relative to the sleeve axis, and means for limiting the movement of the crank pin.

9. An adjustable eccentric mechanism, comprising, a drive member, a cooperative member rotatably supported by the drive member, a rotatable crank pin element mounted in the drive member, means for rotating the cooperative member relative to the drive member, a clutch between the drive member and the crank pin element, and means for controlling the movement of the crank pin relative to the drive member axis when the cooperative member is rotated relative to the drive member.

10. The combination of a drive member, a cooperative member rotatably supported relative to the drive member on the same axis and having a circular recess eccentric to the drive shaft axis, a hub member in said recess, said hub member including a crank pin, means including angularly related slots in the drive and cooperative members respectively, a pin in the slots and a control lever moving said pin for rotating the cooperative member relative to the drive member, and clutch elements between the drive member and the hub for transmitting drive.

11. The combination of a drive member, a cooperative member rotatively mounted in the drive member on the same axis and having a circular recess disposed eccentric to the drive shaft axis, a hub member including a crank pin, means for rotating the cooperative member relative to the drive member, means including meshing gear teeth on the drive member and the hub member respectively for controlling the displacement of the crank pin when the cooperative member is rotated relative to the drive member.

WALTER A. GARRATT.